US008634575B2

(12) United States Patent
Williams

(10) Patent No.: US 8,634,575 B2
(45) Date of Patent: Jan. 21, 2014

(54) SYSTEM FOR ELIMINATION OF ACOUSTIC FEEDBACK

(75) Inventor: Paul Robert Williams, Stevenage (GB)

(73) Assignee: Harman International Industries Limited, Chester (GB)

( * ) Notice: Subject to any disclaimer, the term of this patent is extended or adjusted under 35 U.S.C. 154(b) by 908 days.

(21) Appl. No.: 12/606,978

(22) Filed: Oct. 27, 2009

(65) Prior Publication Data

US 2010/0046768 A1    Feb. 25, 2010

Related U.S. Application Data

(62) Division of application No. 09/658,538, filed on Sep. 9, 2000, now Pat. No. 7,613,529.

(51) Int. Cl.
*H04B 15/00* (2006.01)

(52) U.S. Cl.
USPC ........................................... 381/93; 381/94.3

(58) Field of Classification Search
USPC ............ 700/94; 381/93, 94.1, 94.2, 94.3, 56, 381/57, 312, 94.4–94.9, 318, 406.01, 381/388.07, 387.01
See application file for complete search history.

(56) References Cited

U.S. PATENT DOCUMENTS

| 4,079,199 | A | 3/1978 | Patronis, Jr. |
| 4,091,236 | A | 5/1978 | Chen |
| 4,165,445 | A | 8/1979 | Brosow |
| 4,232,192 | A | 11/1980 | Beex |
| 4,238,746 | A | 12/1980 | McCool et al. |
| 4,382,398 | A | 5/1983 | O'Neill |
| 4,449,237 | A | 5/1984 | Stepp et al. |
| 4,493,101 | A | 1/1985 | Muraoka et al. |
| 4,602,337 | A | 7/1986 | Cox |
| 4,620,069 | A | 10/1986 | Godwin et al. |
| 4,630,304 | A | 12/1986 | Borth et al. |
| 4,649,505 | A | 3/1987 | Zinser, Jr. et al. |
| 4,658,425 | A * | 4/1987 | Julstrom ..................... 381/81 |
| 4,658,426 | A * | 4/1987 | Chabries et al. ............. 381/94.3 |
| 4,817,160 | A | 3/1989 | De Koning et al. |
| 5,027,410 | A | 6/1991 | Williamson et al. |
| 5,029,217 | A | 7/1991 | Chabries et al. |
| 5,046,101 | A | 9/1991 | Lovejoy |
| 5,245,665 | A | 9/1993 | Lewis et al. |
| 5,442,712 | A | 8/1995 | Kawamura et al. |
| 5,506,910 | A | 4/1996 | Miller et al. |

(Continued)

FOREIGN PATENT DOCUMENTS

| DE | 198 14 180 C | 10/1999 |
| EP | 1 298 643 A1 | 4/2003 |
| WO | WO 01/97212 A1 | 12/2001 |

*Primary Examiner* — Davetta W. Goins
*Assistant Examiner* — Daniel Sellers
(74) *Attorney, Agent, or Firm* — Brooks Kushman P.C.

(57) ABSTRACT

A method and system is provided for eliminating acoustical feedback in a system. The method determines a parameter for at least one notch filter, adjusting the notch filter based on the parameter, processing the digital signals through the notch filter, testing at the effect of the notch filter in the system, and removing the notch filter if the notch filter is not effective. Also disclosed is a method and system of selecting candidate frequencies which might be feedback, as opposed to other wanted sound frequencies. The selection method sampling the digital signals, converting the time domain digital signal samples by a fast Fourier transform algorithm into the frequency domain, using a ballistics approach to find prominences in the frequency spectrum, and testing the sizes of the prominences.

20 Claims, 13 Drawing Sheets

(56) References Cited

U.S. PATENT DOCUMENTS

| | | |
|---|---|---|
| 5,677,987 A | 10/1997 | Seki et al. |
| 5,710,823 A | 1/1998 | Nagata et al. |
| 5,717,772 A | 2/1998 | Lane et al. |
| 5,748,751 A | 5/1998 | Janse et al. |
| 5,910,994 A | 6/1999 | Lane et al. |
| 5,912,880 A | 6/1999 | Bernstein |
| 5,941,940 A | 8/1999 | Prasad et al. |
| 5,999,631 A | 12/1999 | Porayath et al. |
| 6,058,194 A | 5/2000 | Gulli et al. |
| 6,058,198 A | 5/2000 | Aceti et al. |
| 6,125,187 A | 9/2000 | Hanajima et al. |
| 6,301,357 B1 * | 10/2001 | Romesburg .............. 379/406.06 |
| 6,539,096 B1 | 3/2003 | Sigwanz et al. |
| 6,690,805 B1 | 2/2004 | Tsuji et al. |
| 7,366,658 B2 * | 4/2008 | Moogi et al. .................. 704/205 |
| 2004/0120535 A1 | 6/2004 | Woods |

* cited by examiner

SYSTEM FOR ELIMINATION OF ACOUSTIC FEEDBACK

CROSS-REFERENCE TO RELATED APPLICATIONS

This application is a divisional of U.S. patent application Ser. No. 09/658,538, filed Sep. 9, 2000, titled SYSTEM FOR ELIMINATION OF ACOUSTIC FEEDBACK, which application is incorporated by reference in this application in its entirety.

TECHNICAL FIELD OF THE INVENTION

The present invention relates to sound systems where a microphone in the vicinity of a loudspeaker might give rise to acoustic feedback.

BACKGROUND

In sound systems, there is some acoustic coupling between a loud speaker, an amplifier, and a microphone so that the entire system forms a closed loop. If a feedback ratio, or "loop gain," exceeds a certain threshold, the system will oscillate, or "ring," and acoustic feedback will occur. This feedback will persist until something is done to reduce the loop gain.

Many sound systems rely on an operator who can determine the presence of acoustic feedback and react before the resonance builds and becomes alarming to the audience, or before equipment damage takes place. The operator normally either reduces the system gain, or manually applies some filtering at a resonant frequency using an equalization device.

The role played by the operator in maintaining system stability against feedback would not be necessary if the system had the ability to detect its own feedback and upon detection, to reduce the loop gain of the system at that particular frequency until the ringing ceased. Accordingly, there is a need for a system or method that can detect the presence of acoustic feedback and automatically reduce the gain at a particular frequency or frequencies.

SUMMARY OF THE INVENTION

The present invention provides a method and system for eliminating acoustical feedback. In one embodiment, the method includes determining at least one parameter for at least one notch filter, adjusting the notch filter based on the parameter, processing the digital signals through the notch filter, testing the effect of the notch filter in the system, and removing the notch filter if the notch filter is not effective.

In some embodiments, the method also includes selecting candidate feedback frequencies, as opposed to other desirable sound frequencies. The selection method may include converting the time domain digital signal samples by a Fourier transform algorithm into the frequency domain, using a ballistics approach to find persistent prominences in the frequency spectrum, and testing the prominences.

DESCRIPTION OF THE PREFERRED EMBODIMENT

The present disclosure discusses a method and system for eliminating acoustic feedback. It is understood, however, that the following disclosure provides many different embodiments, or examples, for implementing different features of the invention. Specific examples of components and arrangements are described below to simplify the present disclosure. These are, of course, merely examples and are not intended to limit the invention from that described in the claims.

Figure 1:
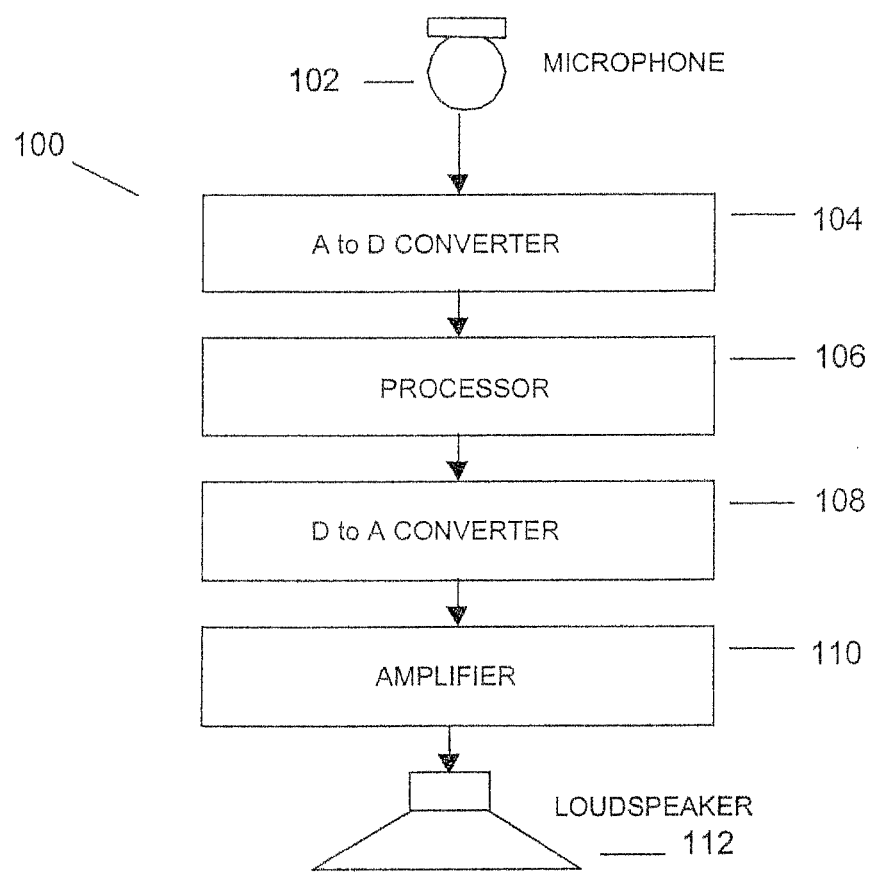
FIG. 1 is a functional block diagram of a sound system incorporating one embodiment of the present invention.

Referring to FIG. 1, a sound system 100 includes at least one microphone 102 that generates electrical signals. The electric signals represent audio signals that are sampled at a given rate (e.g., every 21 microseconds) by a conventional analog to digital converter (ADC) 104. The ADC 104 converts the sampled signals from the microphone into digital samples and sends the digital signals to a digital processor 106. The processor 106 removes any feedback signals from the sound signals and outputs processed digital signals to a conventional digital to analog converter (DAC) 108. The DAC 108 creates analog electrical signals that are sent to a conventional amplifier 110. Amplifier 110 drives a loudspeaker 112 to create acoustic signals that are free of acoustic feedback.

Figure 2A:
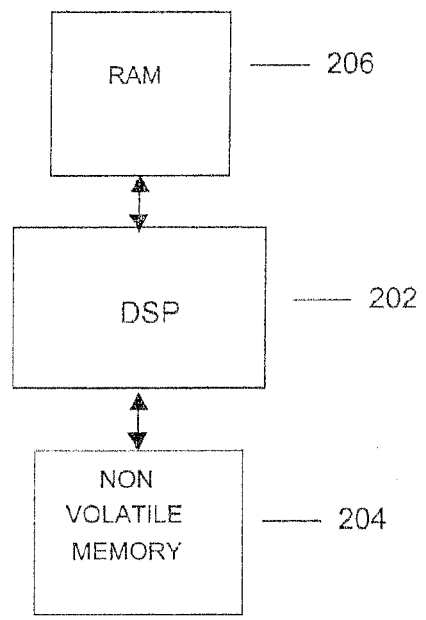
FIG. 2a is a functional block diagram of one embodiment of a digital processor used in the present invention.

Referring to FIG. 2A, in one embodiment, the processor 106 includes a digital signal processor ("DSP") 202 that is coupled to a non-volatile memory 204 for storing program instructions. The DSP 202 is also coupled to a random access memory ("RAM") 206 for storing signals received from ADC 104.

Figure 2B:
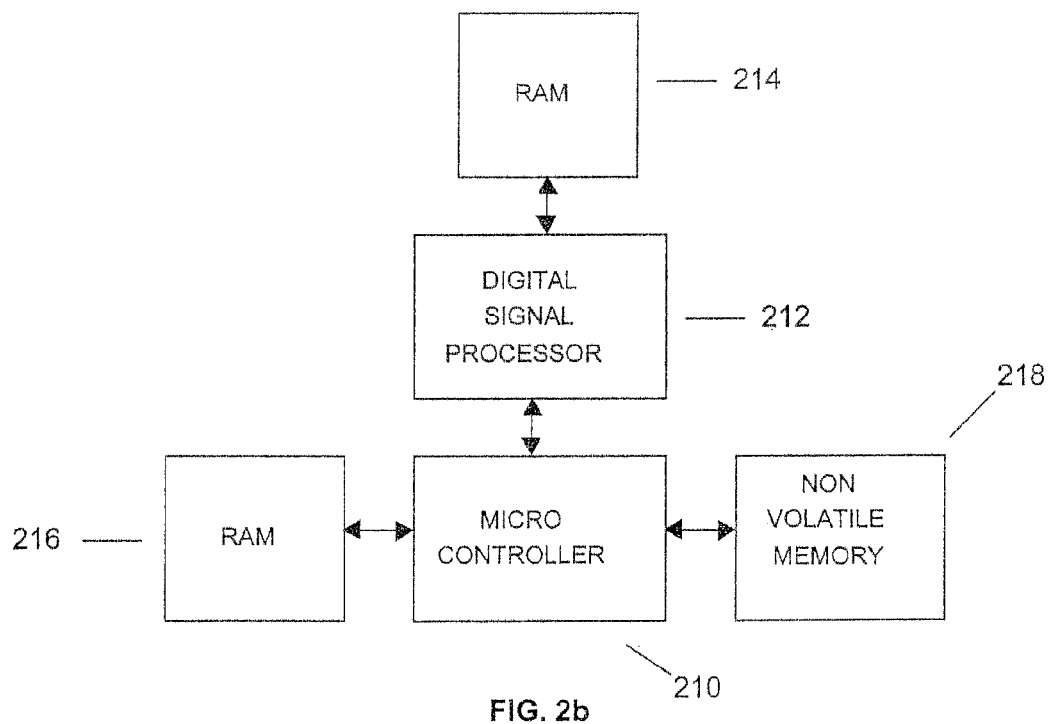
FIG. 2b is a functional block diagram of an alternative embodiment of a digital processor used in the present invention.

Referring also to FIG. 2b, if the processor 106 is incorporated into a product with its own microprocessor, for instance in a loudspeaker controller, a DSP 212 could be coupled to a microcontroller 210. Such an arrangement allows for sharing of resources and functions. In FIG. 2b, the DSP 212 is coupled to its own RAM 214 for data storage. The microcontroller 210 is also coupled to a RAM 216 and non-volatile memory 218. The non-volatile memory 218 can be in the form of flash memory or read only memory ("ROM"). In this embodiment, program instructions may be stored in the non-volatile memory 218, and then loaded during a startup process into the appropriate RAM (e.g., RAM 214, RAM 216, or both).

Figure 3:
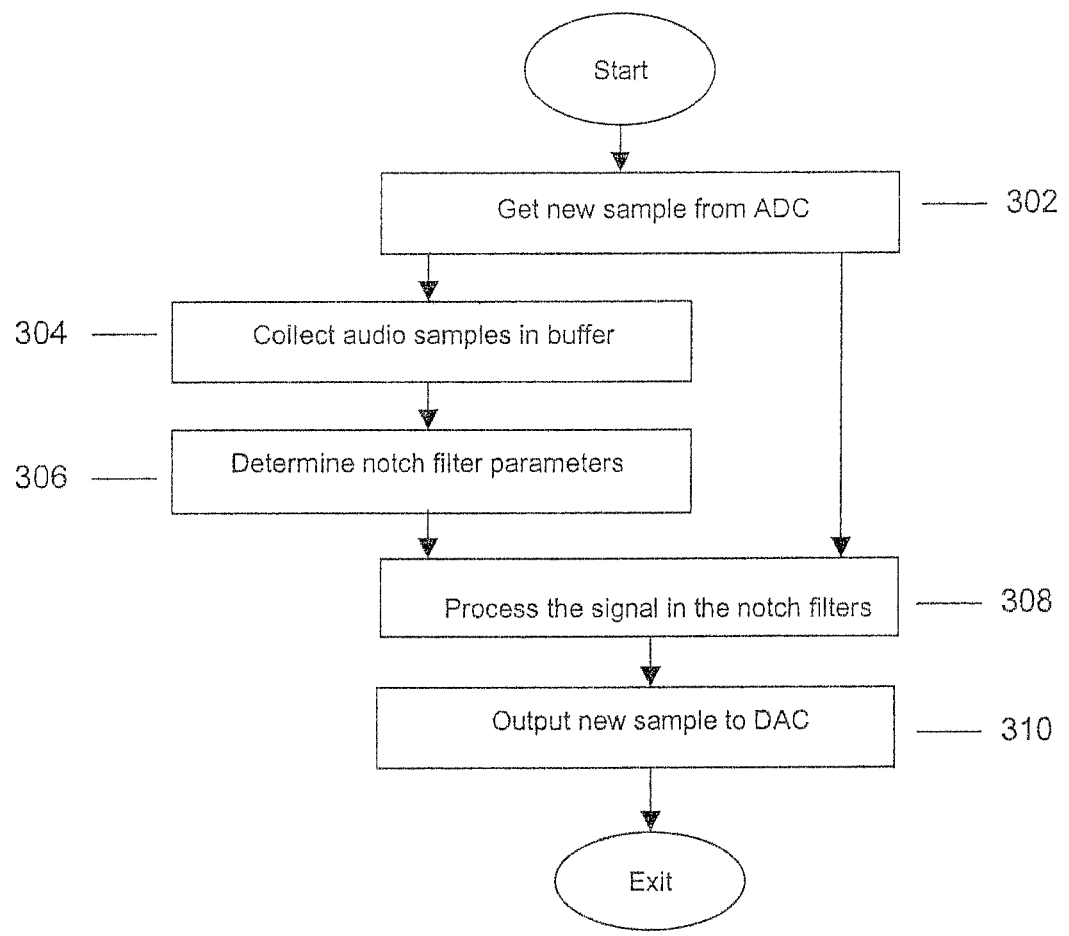
FIG. 3 is a process flow diagram illustrating the processing performed by the digital processor.

FIG. 3 is one embodiment of a process flow diagram illustrating the signal processing steps performed by a digital processor 106 (FIG. 1). In step 302, the processor 106 receives a new digital signal from the ADC 104 every few microseconds (e.g. 21 microseconds). In step 304, these digital samples are stored in a circularized buffer in RAM 206 (FIG. 2A). In step 306, a process is run on the signals stored in the buffer to determine notch filter parameters. This process 306 may be performed at certain intervals, such as every 85 milliseconds. In step 308, using the notch filter parameters, the signals are processed through a series of one or more notch filters operating in the time domain using the filter parameters determined in step 306. A "notch filter" is a filter that rejects (attenuates) a frequency band and passes a lower frequency band and a higher frequency band. After the notch filters are applied, in step 310, the signals are sent to the DAC 108 (FIG. 1).

The signals are filtered and processed at one processing rate (steps 302, 304, 308, and 310), but the notch filter parameters may be determined at a different processing rate (step 306). Thus, there may be two processing flows which is graphically illustrated in FIG. 4.

Figure 4:
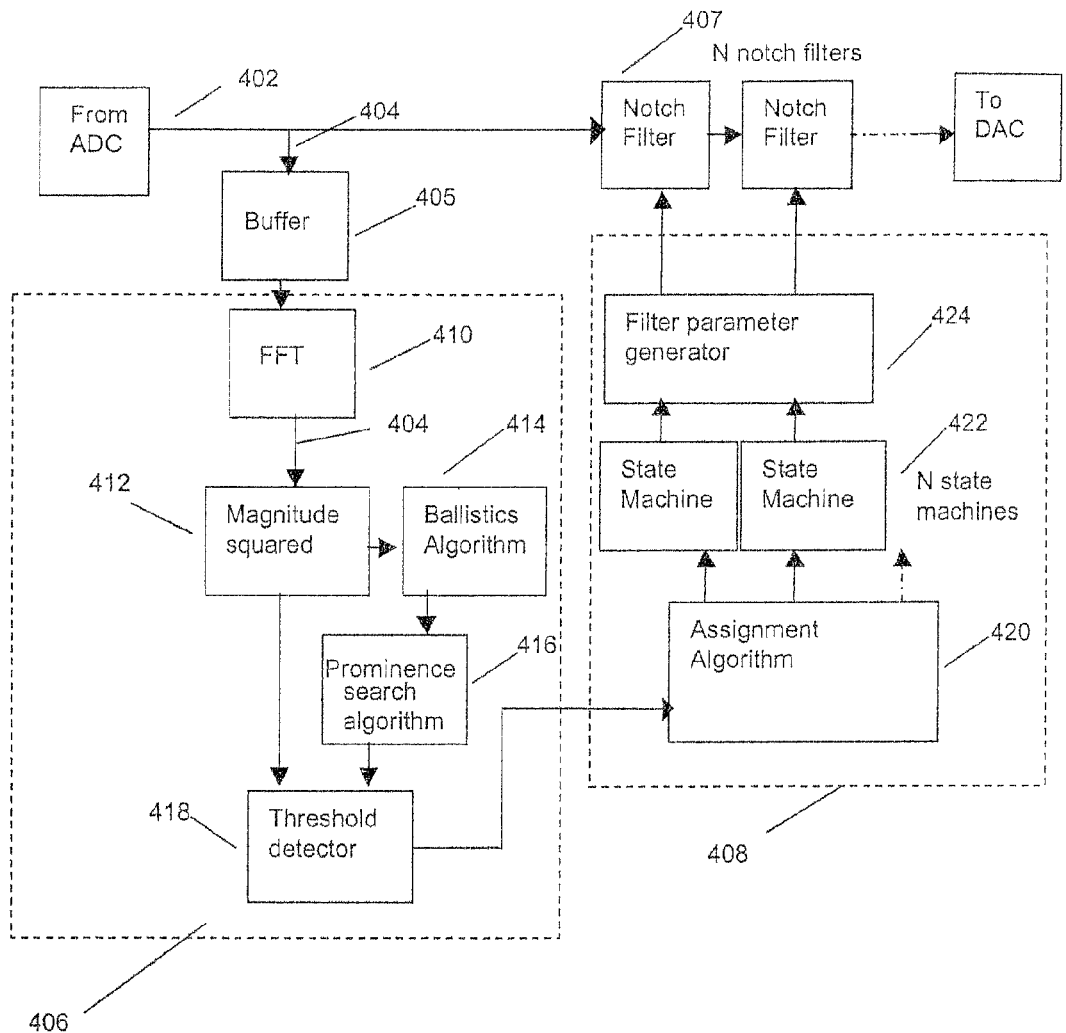
FIG. 4 is a functional block diagram illustrating the functional relationships of the primary processing blocks of one embodiment of the present invention.

In FIG. 4, flow line 402 represents the processing and filtering of the audio signals. The signals processed along flow line 402 are received and processed by notch filters 407 at one processing rate (e.g., one signal every 21 microseconds). However, the processing for determining the notch filter parameters are processed at a different rate (e.g., one signal every 85 milliseconds). This processing is represented by flow line 404. Circular buffer 405 stores copies of the digital signals processed along flow line 402 so that they can be processed at a slower rate along flow line 404.

Conceptually, the process of determining the notch filter parameters can be divided into two major processes, each process comprising a series of subroutines or sub-processes. A first process is the candidate frequency selection process 406. A second process is the implementation process 408. As will be explained in detail later, the candidate frequency selection process 406 uses a Fast Fourier Transform ("FFT") subroutine 410, a magnitude squared subroutine 412, a ballistics process 414, a prominence search routine 416 and a threshold detection process 418.

The implementation process 408 uses an assignment process 420, a series of state machine routines 422, which are coupled with filter parameter generation processes 424. Once the candidate frequencies are selected by the frequency selection process 406, the implementation process 408 tests candidate frequencies by applying a corresponding notch filter at the candidate frequencies in the sound signal in flow path 402 at one or more notch depths over time. A "notch depth" is the amount of filtering (i.e., reduction in amplitude, usually described in decibels) at a particular frequency. If there is good correlation between the trial filter depth changes and the recorded amplitude changes, then the frequency is determined to be the result of acoustic feedback. In this case, one or more of the notch filters 407 are left in the flow path 402 at a predetermined notch depth. If there is poor correlation, then the frequency is determined to be a result of a wanted signal (e.g. music or speech etc), so the notch filter is removed.

As those who are skilled in the art will appreciate, sound signals are converted into digital signals in the time domain, but spectral analysis and discriminations are often performed in the frequency domain. A process known as a discrete Fourier Transform is one method of converting a signal from the time domain to the frequency domain. A Fast Fourier Transform ("FFT") is an efficient and well known algorithm for calculating the discrete Fourier Transform of a signal.

Figure 12A:
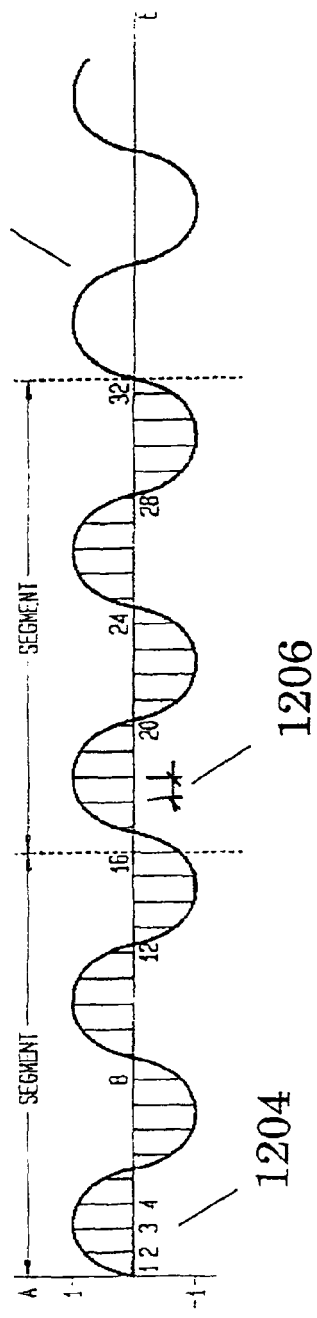
FIG. 12a is a graphical representation of a sinusoidal signal shown in the time domain.
Figure 12B:
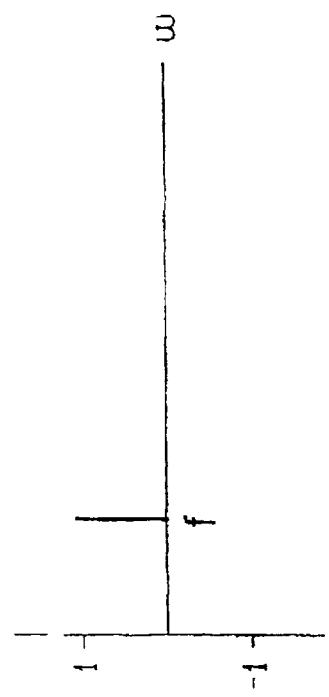
FIG. 12b is a graphical representation of a sinusoidal signal shown in FIG. 12a transformed into the frequency domain.

FIGS. 12a and 12b can be used to illustrate the function of a FFT. FIG. 12a is a plot showing magnitude of an analog sinusoidal signal 1202 of fixed frequency plotted against time (i.e., in the time domain). The analog signal 1202 can be converted to a digital signal by the ADC 104, which samples the signal at discrete instances in time (along the x-axis) with a fixed internal 1206 between the samples. Such samples are represented in FIG. 12a as number vertical lines 1204. The samples may then be converted into the frequency domain by means of the FFT to determine the frequency components of the signal in a discrete manner. For simplicity, the signal 1202 is shown sampled at an interval 1206 that provides 16 sample points per time segment, or FFT frame. The preferable number of sample points is a number that is a power of two. The greater the sample points per segment, the greater the discrimination and filtering capability. One embodiment of the present invention uses 4096 sample points per time segment.

Utilizing the FFT algorithm, each segment or "frame" of the time domain signal can be converted into the frequency domain. The number of discrete frequency components which can be distinguished in the frequency domain is equal to half the number of samples in the segment. For the example of FIG. 12a, the Fast Fourier Transform of each segment of the signal is distinguishable into sixteen different evenly spaced frequency components for a given frequency band. When the frequency spectrum is expressed in hertz, the frequency band runs from 0 to one-half of the actual sampling rate.

FIG. 12b is a graphical representation of the time domain signal of FIG. 12a transformed into a frequency spectrum (i.e., the frequency domain) by a FFT analysis. FIG. 12b shows a plot indicating the relative magnitude (i.e., the vector of the real and imaginary components) of the signal at a particular frequency. The relative sizes of these components are determined from the phase of the sinusoid relative to the FFT frame. Because the signal 1202 is a sine wave of fixed frequency, the corresponding frequency domain plot has only one frequency component, namely, a component at frequency f.

Figure 13A:
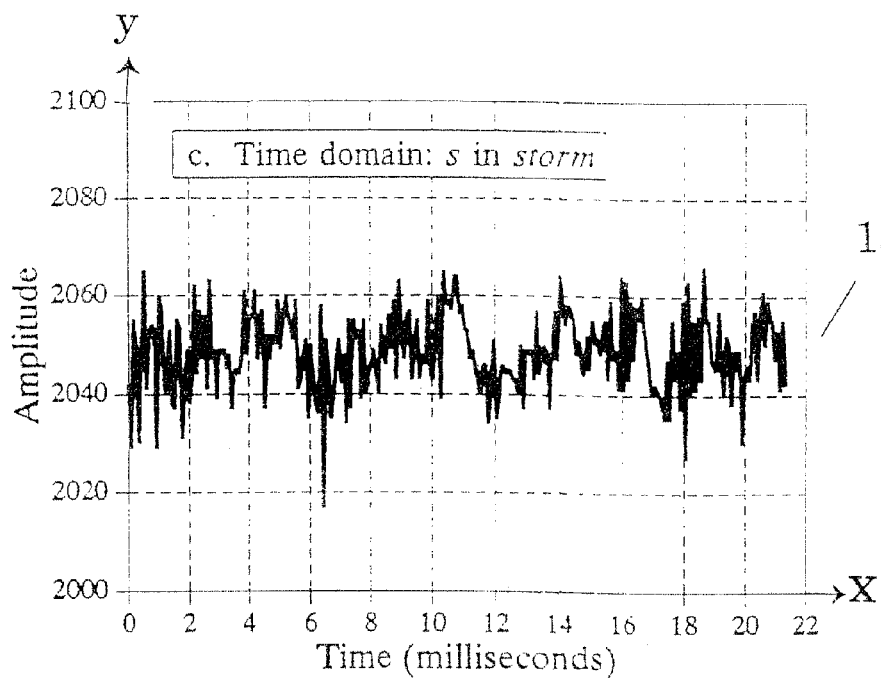
FIG. 13a is a graphical representation of an illustrative signal in the time domain.
Figure 13B:
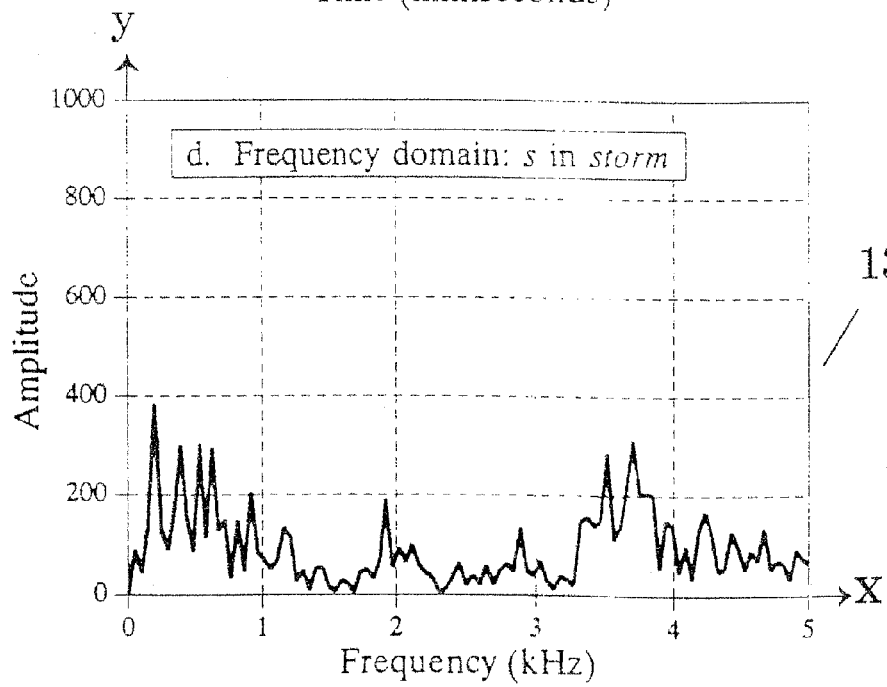
FIG. 13b is a graphical representation of the illustrative signal shown in FIG. 13a transformed into the frequency domain.

FIG. 13a is another example illustrating a complex time domain signal 1302. FIG. 13b is a frequency spectrum 1304 of the signal 1302 illustrated in FIG. 13a. The vertical y-axis of FIG. 13b represents the relative magnitude of the signal 1304 at a particular frequency on the horizontal x-axis. As those skilled in the art will appreciate, the FFT produces arrays representing the real and imaginary components of each segment of the frequency response. These output arrays are known as "bins" and typically represent the relative magnitude of the energy for the signal within a discrete frequency range. Therefore, each bin or "frequency bin" represents a fixed width of the frequency spectrum.

When a typical signal is converted into the frequency domain by the FFT, this signal has frequency components divided into bins representing the entire frequency spectrum. A frequency spectrum or FFT "frame" is the array of output bins produced for any given time segment. A new FFT frame can be produced at regular intervals.

Figure 5:
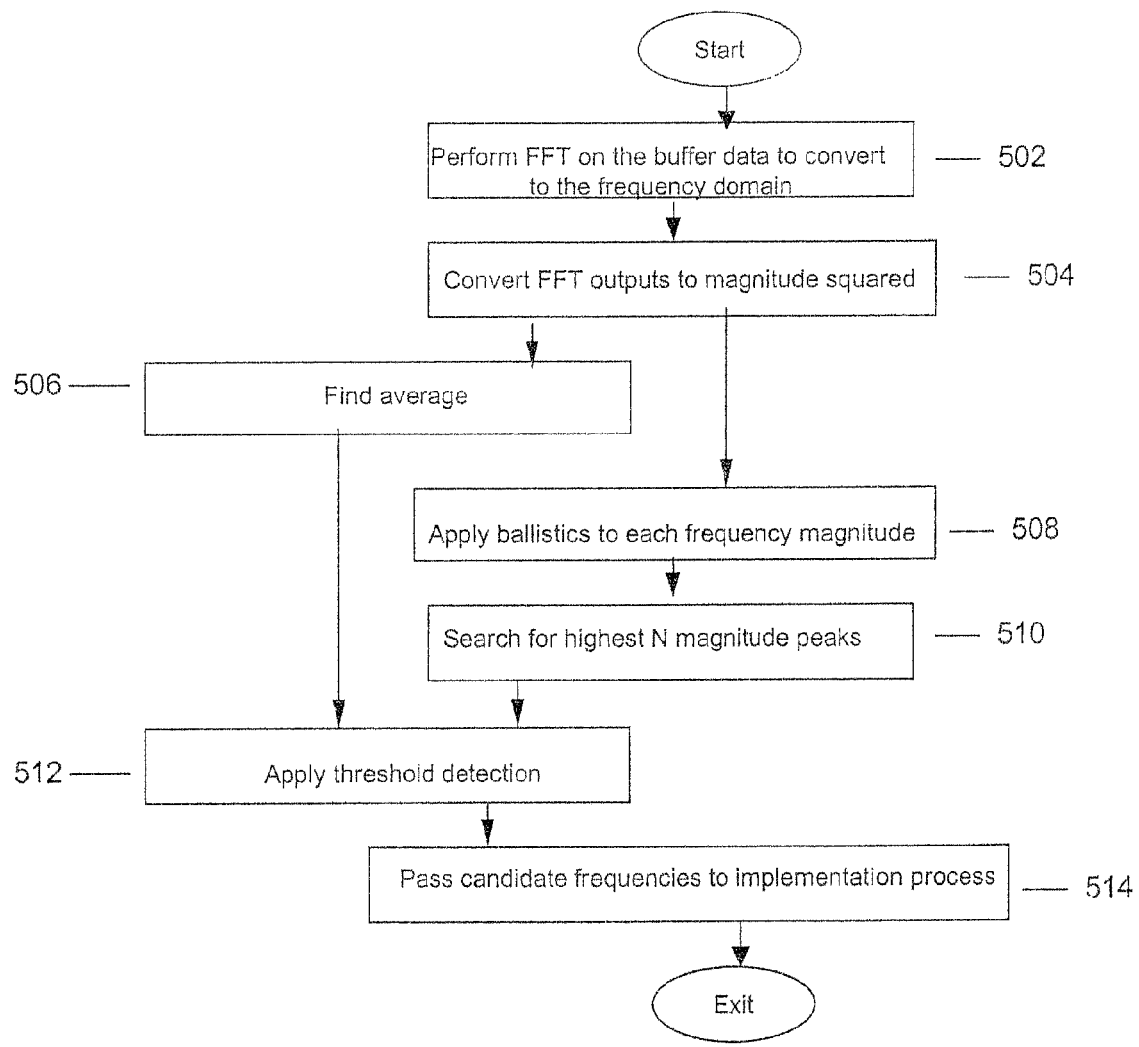
FIG. 5 is a process flow diagram illustrating one embodiment of the candidate selection process.

Turning now to FIG. 5, the candidate frequency selection process 406 is illustrated in more detail. The candidate frequency process 406 selects candidate frequencies and, then discriminates or eliminates many of the initial candidate frequencies. Too many candidate frequencies would disrupt the audio signal to an unacceptable degree.

Once a predetermined number of new signals have accumulated in a signal storage buffer (e.g., a predetermined portion of RAM 206 or RAM 216), in step 502, the signal information in the buffer is processed using a Fast Fourier Transform algorithm (FFT). In one embodiment of the present invention, a FFT is run once every 4096 samples, and produces 4096 bins per FFT frame. The rate at which FFTs are run is 1/4096th of the sample rate, or about 85 milliseconds. This effectively produces a sample rate of 11.7 Hz for FFT processing. The FFT transforms the time domain signal into a pair of arrays of FFT bins representing the real and imaginary components of the signal in the frequency domain.

In step 504, half of the real and imaginary output arrays from the FFT are combined by summing the squares of each to produce an array of bins representing the magnitudes squared. The other half is a redundant mirror image. Thus, in the present embodiments, 2048 magnitude-squared values are stored for later analysis.

In step 506, all the "magnitude squared bins" are averaged into a Mean-Square value, or a mean value of the magnitude-square values. Such a value is a measure of the energy of the signal during the current FFT frame. This value can be used as a reference of the energy of the overall signal against which the feedback energy can be compared by examining the ratios between them. As those skilled in the art will appreciate, the ratios can be compared with either squared or linearly represented data. Consequently, the present invention should not be interpreted as being limited to analyzing data based only on "squared data."

In step 508, the ballistics process 414 is then applied to the magnitude squared bins or "frequency magnitude bins." The ballistics sub-process is actually a bank of digital filters operating in the (frame rate) time domain on each FFT bin. For each frequency magnitude bin, a running average value of past bin values can also be kept in memory.

Figure 6:
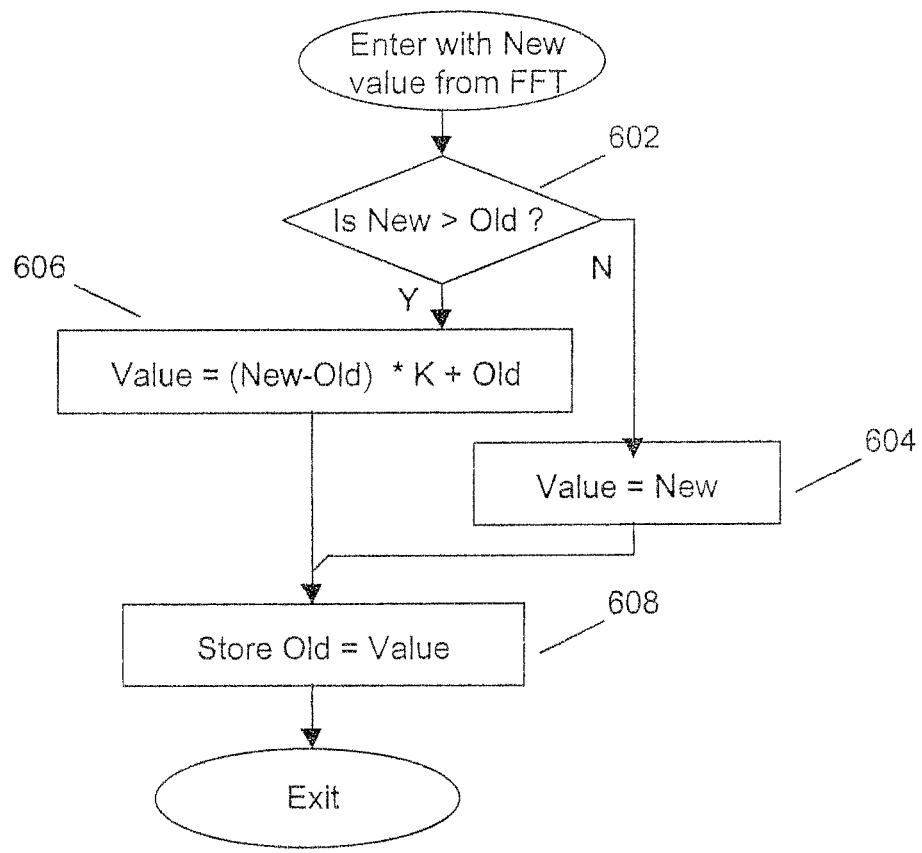
FIG. 6 is a process flow diagram illustrating the one embodiment of the ballistics selection process.

FIG. 6 provides one example of a ballistics process, such as may be used by the ballistics process 414. In step 602, the new value of the frequency magnitude bin ("NEW_VALUE") is compared to the previous value from previous FFT frames ("OLD_VALUE"). If the NEW_VALUE is less than the OLD_VALUE, then the OLD_VALUE is set to the NEW_VALUE in step 604. On the other hand, in step 606, if the NEW_VALUE is greater than the OLD_VALUE, the OLD_VALUE is set to the following first order filtering equation:

$$OLD\_VALUE=(NEW\_VALUE-OLD\_VALUE)*K+OLD\_VALUE.$$

Where K is the filtering coefficient according to the equation:

$$K=1-(1-\text{Threshold})^{(1/(t*Ffs))}$$

Where t is the time value to reach threshold, for example 1 second, the Threshold is the fractional value for which the time value is calibrated, for example 0.5, and Ffs is the frame sample rate, for example 11.7 Hz Such filtering is only applied when the NEW_VALUE from the FFT is greater than the OLD_VALUE in memory. In step 608, when the NEW_VALUE from the FFT is less than the OLD_VALUE in memory, the value in memory is replaced by the NEW_VALUE from the FFT. The result causes higher values (attack phase) to build up in the memory over time, whereas lower values (release phase) are reflected in the memory instantly (zero release time).

Figure 7A:
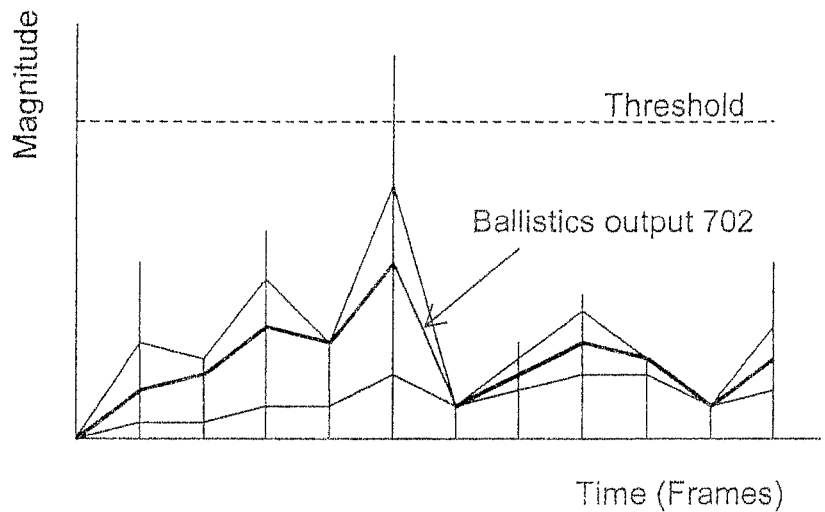
FIG. 7a is an illustration of the results of one embodiment of the ballistics selection process.
Figure 7B:
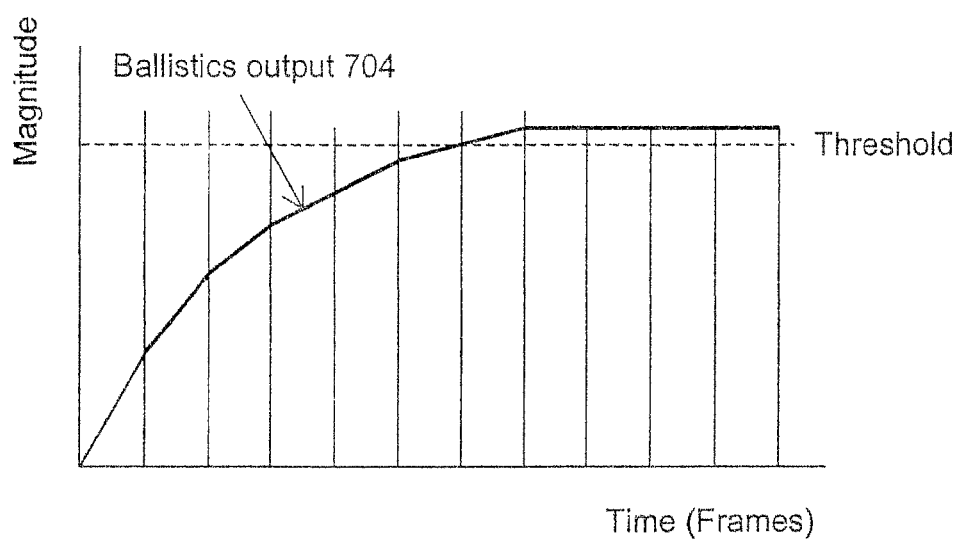
FIG. 7b is an illustration of the results of one embodiment of the ballistics selection process.

The operation of the ballistics subroutine as it performs multiple iterations can be illustrated graphically in FIGS. 7a and 7b. FIG. 7a illustrates a graph of a ballistics output or response 702 ("OLD_VALUE") of a single FFT bin with a music signal plotted over time. The rapidly changing music signal causes the "OLD_VALUE" to "release" or decrease as the signal varies. FIG. 7b, on the other hand, illustrates a graph of a ballistics response 704 with a feedback signal. Lingering tones, such as feedback signals, will build up over time. As can be seen, the magnitude of the "OLD_VALUE" steadily increases to a threshold value over several FFT frames. Thus, the individual frequency bins can be said to have an "attack" or "ballistic" characteristic applied which causes "prominences" to gradually build for the frequency signals that persist, such as feedback signals.

A longer time-constant can be applied to frequency bins representing the lower sound frequencies. The use of a longer time-constant helps to discriminate against bass notes which often persist, without degrading the response time to attenuate high frequency feedback, which often builds up faster, is more alarming, and potentially more damaging. The present embodiments use a time-constant of 2 seconds at the low-frequency end and a time-constant of 200 milliseconds at the high frequency end. The time-constant is defined as the time taken to reach 6 dB below the threshold value (i.e., 0.5 of the target value). After the OLD_VALUE is stored for each frequency bin at step 608, the ballistics subroutine ends.

Referring again to FIG. 5, upon completion of the ballistics process 414 at step 508, execution proceeds to step 510. In step 510, the prominence search routine 416 selects a predetermined number "N" of the highest "OLD_VALUEs" or "prominences" from the output of the ballistic process 414. The present embodiment uses N=six as a predetermined number, but any predetermined number could be used.

In step 512, the amplitude (i.e., magnitude stored in the frequency bin) and the frequency bin number (indicating the frequency) of these N highest prominences are then passed to the threshold detection process 418. The threshold detection process 418 assures that the prominences are at least a predetermined magnitude (i.e. is must be loud enough to cause problems), and a predefined amount above the mean squared value (i.e. is the feedback frequency significant compared to the level of music/background noise).

Figure 8:
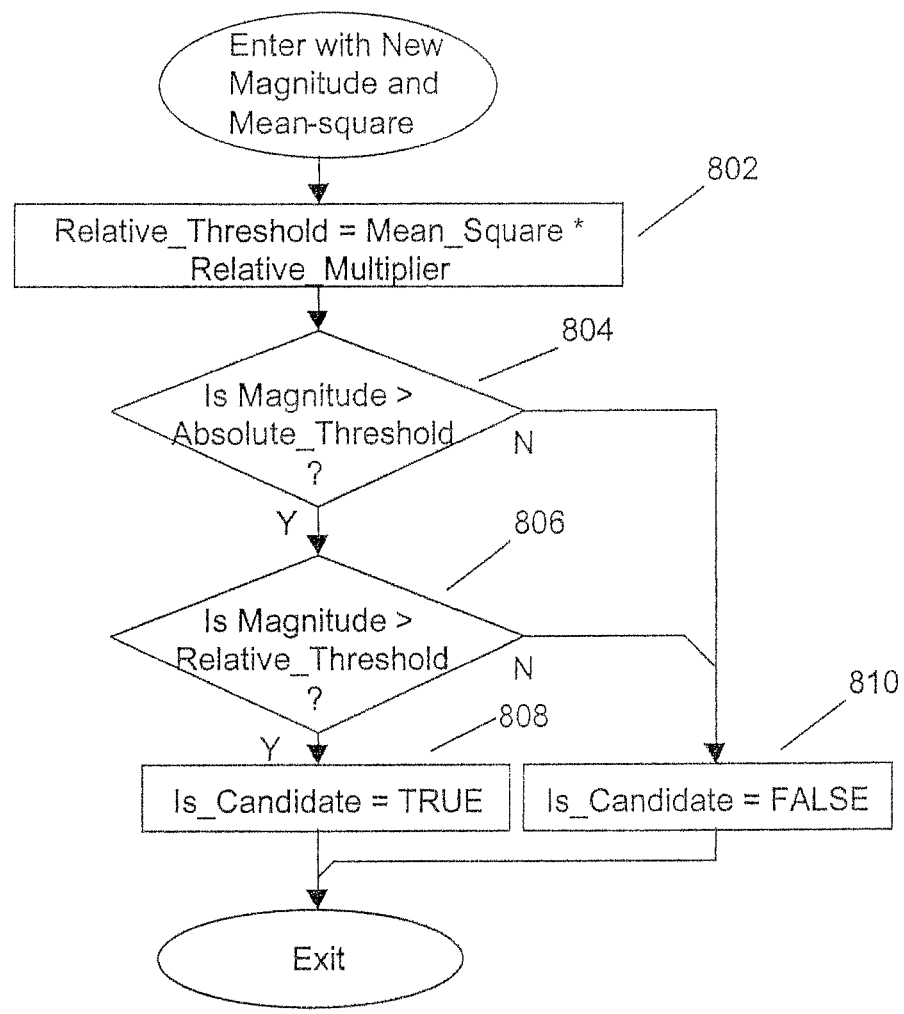
FIG. 8 is a process flow diagram illustrating one embodiment of the threshold discrimination process.

FIG. 8 describes one embodiment of the threshold detection process 418. In step 802, a relative threshold variable ("RELATIVE_THRESHOLD") is computed according to the following formula:

$$RELATIVE\_THRESHOLD=MEAN\_SQUARE*RELATIVE\_MULTIPLIER$$

Where the RELATIVE_MULTIPLIER is a predetermined amount. The present invention uses a RELATIVE_MULTIPLIER of $(L/150)^2$, where L is the length of the FFT, for example 4096. However, if actual magnitude values were used rather than square values, the multiplier would be (L/150). The value of the mean MEAN_SQUARE variable has been determined previously in step 506 (FIG. 5).

In step 804, the magnitude of the frequency bin under consideration is compared to an ABSOLUTE_THRESHOLD variable. One embodiment sets this variable at a value equivalent +85 dB SPL at a distance of 1 meter from the loudspeaker. If the frequency bin magnitude is less than the ABSOLUTE_THRESHOLD, that frequency bin is not considered to be a candidate for frequency feedback and the subroutine logic continues to step 810. Step 810 sets a flag indicating that the frequency bin under consideration should not be considered to be a candidate frequency. Thus, the test performed in step 804 will only allow a frequency to be considered a candidate if the magnitude of its bin exceeds a certain volume. This prevents low-level signals from being further processed, even if the cause is feedback, on the basis that feedback which is barely audible is probably not worth filtering.

If at step 804 the frequency bin magnitude is greater than the ABSOLUTE_THRESHOLD, than the subroutine logic continues to step 806 where a comparison is made between the frequency bin magnitude and the RELATIVE_THRESHOLD (computed in step 802). If at step 806 the frequency bin magnitude is less than the RELATIVE_THRESHOLD, then that frequency bin is not considered to be a candidate for frequency feedback and the subroutine logic continues to step 810. Otherwise, execution proceeds to step 808, where a flag is set indicating that the frequency bin should be considered to be a candidate frequency. The test of step 806 only allows a frequency to be considered a candidate if the amplitude of its bin exceeds the average bin level by a given amount. This prevents feedback from being attenuated, which is already hidden by wide-band signals and is thus not doing any harm. This also helps to discriminate feedback from wanted signals since it will favor pure tones. In other words, the prominence is sufficiently below the rest of the sound spectrum so that it will not be discerned.

Figure 9:
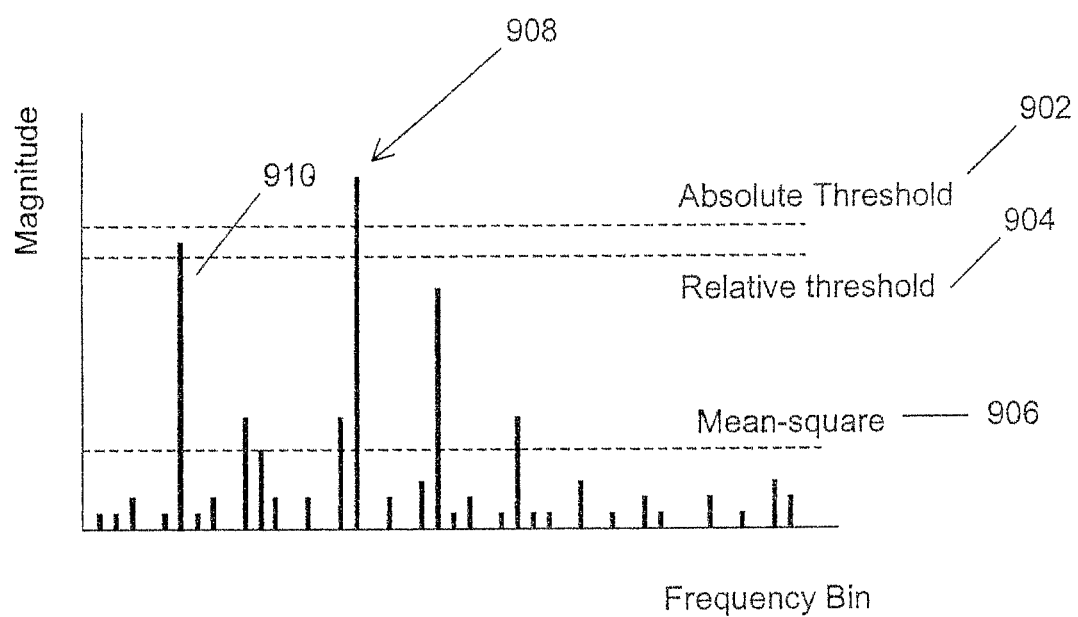
FIG. 9 is a graphical representation of an illustrative frequency spectrum which may be typical of the output of one embodiment of the present invention.

Thus, only prominences that are above both of these thresholds (i.e., RELATIVE_THRESHOLD and ABSOLUTE_THRESHOLD) are then considered to be candidate frequencies. This concept is illustrated graphically in FIG. 9. FIG. 9 shows a frequency spectrum indicating an absolute threshold level 902, a relative threshold level 904, and a mean-square level 906 (which is used to calculate the relative threshold 902). A prominence 908 would be passed on as a candidate for future consideration because its magnitude is greater than both the absolute threshold 902 and the relative threshold 904. Prominence 910 would not be passed on as a candidate frequency because the magnitude of prominence 910 is not greater than the absolute threshold level 902.

Referring again to FIG. 5, if at step 512 the candidate frequencies meet the conditions of the threshold detector subroutine, they are passed to the implementation process 408 in step 514. As previously discussed, the implementation process 408 tests of the candidate frequencies by testing the effect of a notch filter on the candidate frequency. One embodiment of the implementation process 408 uses assignment process 420 to assign a state machine subroutine to each candidate frequency. After the candidate frequencies are assigned to one of the state machine routines 422, the appropriate state machine algorithm is executed.

One embodiment of the assignment process 420 is control scheme that runs the state machine subroutines in succession from zero to the last state machine routine. (There are N state machines for N notch filters because one state machine controls one notch filter). One embodiment of this routine uses 6 filters. Any number of filters, however, could be used. For each candidate frequency, the assignment process 420 searches all state machine routines, if the candidate frequency is already in use, the candidate frequency is assigned to the same state machine routine. If the candidate frequency is not already in use, the candidate frequency is assigned to the first free state machine routine.

Figure 10:
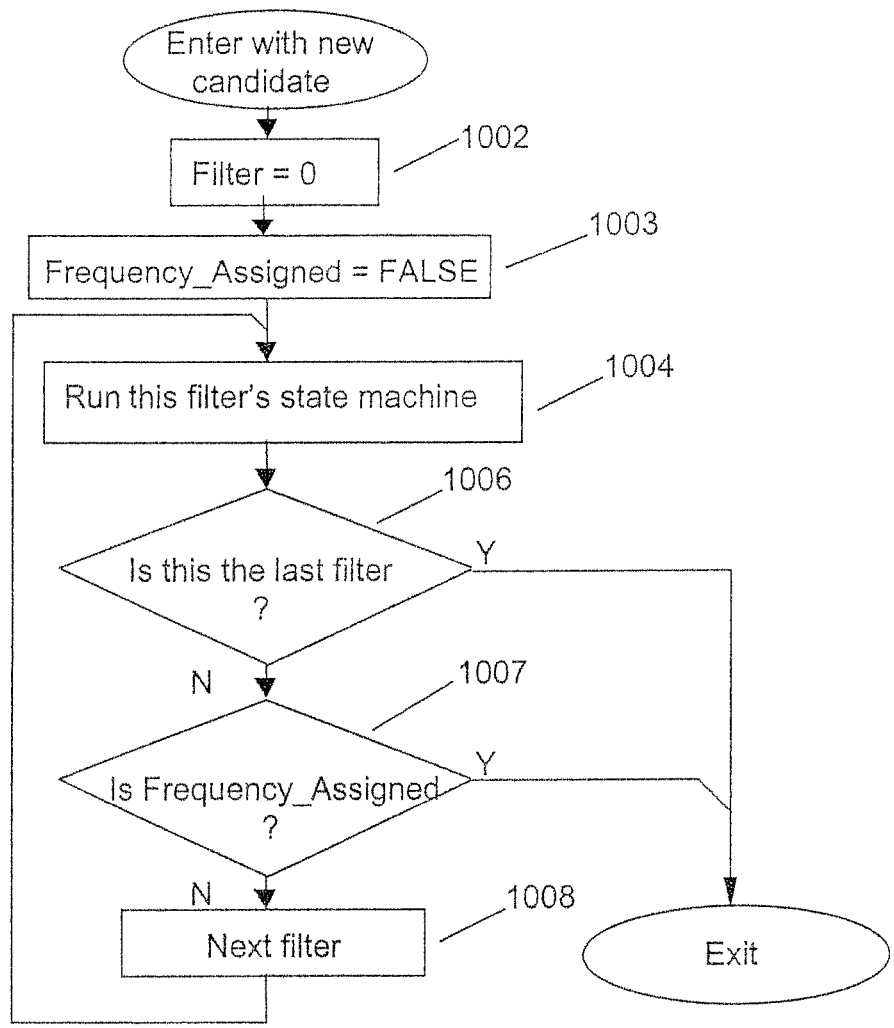
FIG. 10 is a process flow diagram illustrating one embodiment of the assignment process.

FIG. 10 illustrates one embodiment of the assignment process 420. In step 1002, a filter counter is set to zero. In step 1003, a flag FREQUENCY_ASSIGNED is set to false. In other words, it is assumed that the new candidate frequency has not yet been assigned to the current notch filter.

In step 1004, the state machine subroutine assigned to the current filter is executed. Step 1006 determines whether the filter counter has incremented to the last filter number (i.e., "N"), if it has, then the assignment process 420 exits. If not, then step 1007 determines whether the flag set for the candidate frequency in step 1003 is still false. (In other words, has the appropriate state machine routine changed the flag?) If the flag is set to true, then the candidate frequency has already been assigned and the routine exits. If not, the filter counter is incremented in step 1008, and the program logic returns to step 1004.

The state machine routines 422 which are individually assigned to the candidate frequencies causes each candidate frequency is to be "tested" by setting the associated notch filter to the appropriate candidate frequency at a given attenuation depth and bandwidth. There is a state machine subroutine associated with each of the N notch filters so that the current status of each filter can be tracked. The state machine routines track when each notch filter is idle (ready for a new assignment), when the filter is testing a trial notch, and when the filter is engaged in feedback suppression (i.e. not longer a candidate since feedback discrimination has been successful). If, after a predetermined test time, the measured amplitude at the candidate frequency has been reduced by a predetermined minimum amount, then genuine feedback is said to have been detected, and the filter is left in place at a predetermined depth, otherwise the filter is canceled.

Figure 11:
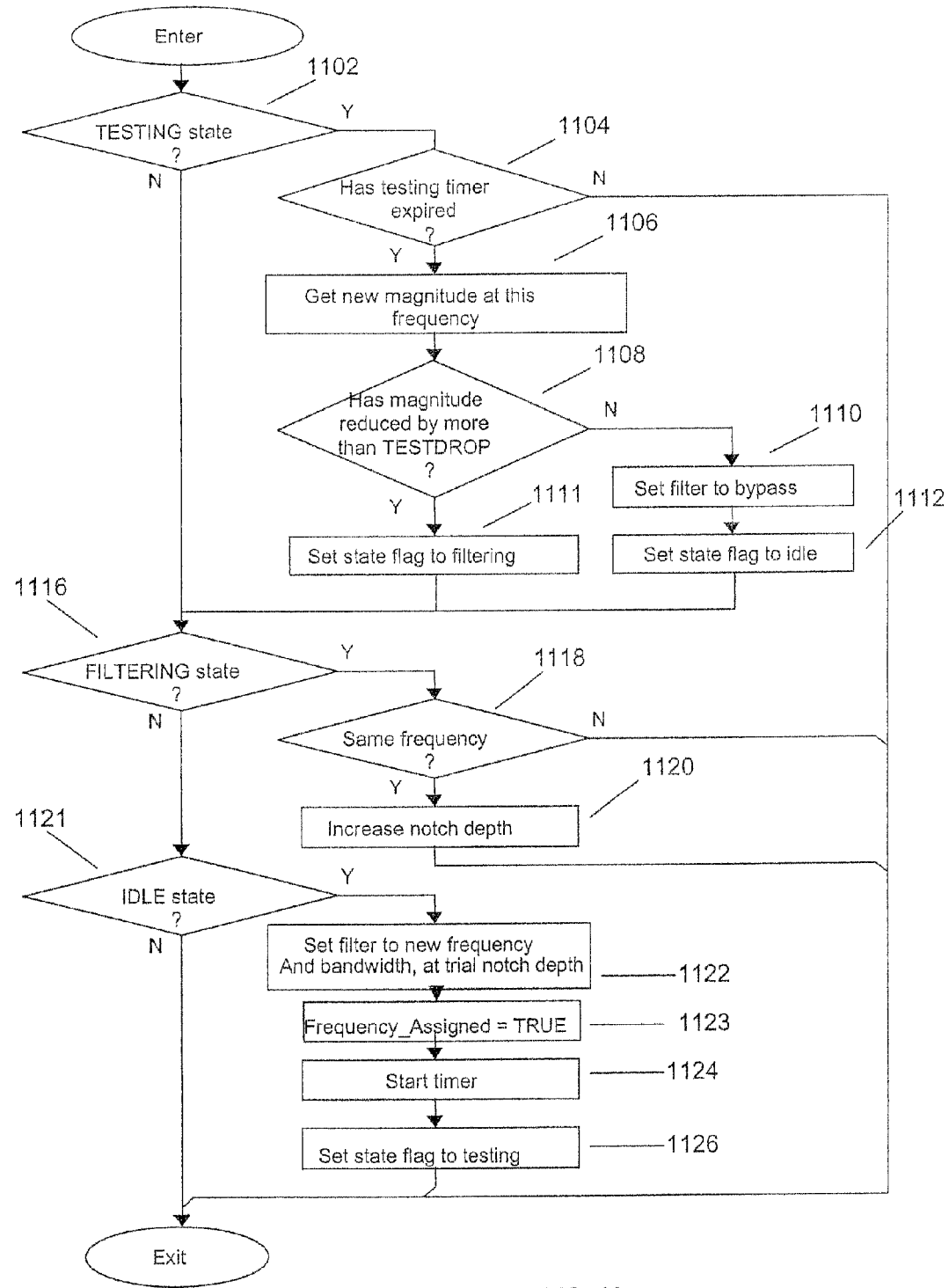
FIG. 11 is a process flow diagram illustrating one embodiment of the state machine process.

The logic used by one embodiment of the state machine routine is illustrated in FIG. 11. The candidate frequency is passed to the state machine. In step 1102, a state flag is checked to determine whether or not it is in a testing state for the candidate frequency passed to the state machine routine. If the state flag has been set, a check in step 1104 is run against a timer routine to determine whether a time limit for the state machine has expired. One embodiment of the present invention uses a time limit of 500 milliseconds. The timer may be a software routine used to measure time intervals. Such routines are well known to those who practice the relevant art. In one embodiment of the present invention, the timer could simply be a counter to count FFT frames because the frames are processed at regular intervals.

If the time limit has not expired (step 1104), the notch filter is still in a testing state. The subroutine terminates and no action is taken. If the time limit has expired, the current bin magnitude for the frequency is retrieved in step 1106.

In step 1108, the magnitude is checked to see if it has been sufficiently reduced by comparing the reduction in magnitude at the candidate frequency to a predetermined value: TESTDROP. In one embodiment, TESTDROP is 3 dB. If the magnitude for the candidate frequency has not been reduced by TESTDROP, the candidate frequency is not likely to be feedback. Consequently, the parameters of the notch filter are set to "bypass" in step 1110 (which can also be done by setting the notch depth to 0 db causing the filter to have no effect on the audio signal.) The idle state flag is set in step 1112.

Once the TESTDROP comparison has failed, the filter bypassed, and the state set to Idle, the state machine routine and the filter are ready to be reassigned (in the same frame if necessary) to another frequency. Consequently, the notch filter will no longer function at that candidate frequency. If the magnitude of the frequency has been sufficiently reduced by more than TESTDROP, then in step 1111, the filtering state flag is set. In either situation, the logic continues with at step 1116.

In step 1116, the state flag is checked to determine if it has been set to filtering (to determine if the notch filter is currently filtering a feedback frequency). If so, a check is performed in step 1118 to determine whether the notch filter is currently set to the same frequency or within a few bins of the new candidate frequency. Checking within a few bins of a candidate frequency creates a "deadband" each of candidate frequency to assure that additional candidate frequencies are not erroneously located around the main candidate frequency in future iterations. One embodiment of this routine uses 2 bins.

If it is the same frequency (or close to the same frequency), the notch depth is increased in step 1120. If the current frequency is not the same as the candidate frequency, then the program exits so that the candidate frequency can be tested by another filter state machine.

Referring back to step 1116, if the state flag is not set to the filtering state, then the logic proceeds to step 1121. Step 1121 tests the state flag to see if the filter is in the idle state. If the state flag is not in an idle state, the routine exits. If the state flag is set to the idle state, (indicating that the filter is bypassed), then in step 1122 new filter parameters are set. The filter parameters may include new frequency, bandwidth, and trial notch depth. As those skilled in the art will realize, the bandwidth is a function of the specific FFT length and windowing used. In one embodiment, the bandwidth is determined by the following pseudo code equation:

BandWidth(Octaves)=(WINDOW_SMEAR*
SAMPLE_RATE/FFT_LEN)/Frequency (Hz)

If(BandWidth<MIN_BANDWIDTH),then
BandWidth=MIN_BANDWIDTH

In the above pseudo code routine, the variable "WINDOW_SMEAR" compensates for the smearing factor of FFT windowing. In the present invention, this is set to 2.1 for a Hann window, which is one of many windows that could be used with an FFT analysis. The SAMPLE_RATE is 48000, the FFT_LEN is 4096, and the MIN_BANDWIDTH is 0.05. The notch filters could also be set to a predetermined bandwidth if a FFT is used with sufficient resolution and over a given sensible frequency range of operation. One embodiment uses a trial notch depth of 6 dB. The trial notch depth is increased in depth in steps of 6 dB when feedback is detected at the same frequency as the one already being filtered.

In step 1123, the variable FREQUENCY_ASSIGNED is now set to "true." This variable is passed to assignment process 420 to indicated that this state machine has now been assigned a new frequency. The timer is reset to zero and started in step 1124. In step 1126, the state flag is set to testing and the subroutine exits.

After being modified by the notch filters 407, the resulting signal is passed to the DAC 108 for conversion back to the analog domain, the resulting signal being passed ultimately to the amplifier 110 and loudspeaker 112 for reproduction.

In sum, the present embodiment is very effective at picking lingering tones out of a noisy (music) background. The process ensures that frequencies that are not continuous (and are thus probably music signals) are not considered for candidature. A tone must be present continuously for a period of time before becoming a candidate. Also, the rate at which the tone build up in the ballistics memory is dependent on the amplitude of the tone, so a high level tone is acted on more urgently than low level ones.

Once the candidate frequencies are selected by the frequency selection process, the implementation process continuously tests candidate frequencies by applying trial notch filters at the candidate frequency. If there are good results, then the frequency is determined to be the result of acoustic feedback. If there are poor results, then the frequency is determined to be a result of a wanted signal (e.g. music or speech etc), so the notch filter is removed.

The present embodiment, therefore, dynamically guards against feedback in applications where the conditions are continuously changing, such as where a microphone is mobile, and is being moved around in the same environment as the loudspeaker(s).

What is claimed is:

1. A method of reducing acoustic feedback in a system comprising:
   sequentially converting a buffered acoustic signal to a plurality of sequential frames in a frequency domain, each frame comprising an array of frequency magnitude bins, where each bin represents a fixed width of the frequency spectrum and contains corresponding frequency components of the acoustic signal divided into corresponding bins;
   comparing a first value of a first frequency magnitude bin that is included in a first frame of the sequential frames with a second value of the first frequency magnitude bin that is included in a second frame of the sequential frames;
   updating the first frequency magnitude bin, in response to the second value being greater than the first value, with a value determined as a function of the first value, the second value and a determined filter coefficient;
   selecting the updated first frequency magnitude bin to be a candidate frequency; and
   setting a notch filter to the candidate frequency at an attenuation depth and a bandwidth to suppress feedback.

2. The method of claim 1 further comprising setting the first frequency magnitude bin, equal to the second value in response to the second value being less than or equal to the first value.

3. The method of claim 1 where increasing the first value comprises calculating the filter coefficient as a function of a threshold, a time constant, and a frame sample rate.

4. The method of claim 1 where selecting the first frequency magnitude bin comprises determining that the first frequency magnitude bin is at least a predetermined magnitude.

5. The method of claim 4 where the filter coefficient comprises an adjustable time constant, and monitoring the first frequency magnitude bin comprises monitoring over a determined number of the frames based on the adjustable time constant.

6. The method of claim 5 where monitoring the first frequency magnitude bin further comprises adjusting the adjustable time constant based on a frequency of sound being represented in the first frequency magnitude bin.

7. The method of claim 5 where monitoring the first frequency magnitude bin further comprises applying a longer time constant to the first frequency magnitude bin in response to the first frequency magnitude bin being representative of a lower sound frequency, and applying a shorter time constant to the first frequency magnitude bin in response to the first frequency magnitude bin being representative of a higher sound frequency.

8. The method of claim 5 where the adjustable time constant is of the range 200 milliseconds to 2 seconds.

9. The method of claim 5 where the adjustable time constant is defined as the time taken to reach 6 dB below a threshold.

10. The method of claim 9 where selecting the candidate frequency is based on a comparison of the updated first frequency magnitude bin to a relative threshold of the buffered acoustic signal and an absolute threshold.

11. The method of claim 10 where the relative threshold is a function of an energy level of the buffered acoustic signal and a predetermined relative multiplier.

12. The method of claim 1, further comprising, determining the state of the notch filter based on a correlation between the notch filter parameters and a recorded sound.

13. A system for reducing unwanted acoustic feedback comprising:
    a processor;
    a memory accessible to the processor;
    programming comprising instructions stored in the memory to sequentially convert a buffered acoustic signal to a plurality of sequential frames in a frequency domain, each frame comprising an array of frequency magnitude bins;
    programming comprising instructions, stored in the memory to compare a first value of a first frequency magnitude bin that is included in a first frame with a second value of the first frequency magnitude bin that is included in a second frame;
    programming comprising instructions stored in the memory to, in response to the second value being greater than the first value, replace the first value in the first frequency magnitude bin with a value computed as a function of the first value, the second value and a determined filter coefficient;
    programming comprising instructions stored in the memory to select the replaced first frequency magnitude bin to be a candidate frequency; and
    programming comprising instructions stored in the memory to set a notch filter to the candidate frequency at an attenuation depth and a bandwidth to suppress feedback.

14. The system of claim 13 where programming comprising instructions stored in the memory to compare a first value further comprises programming comprising instructions stored in the memory to set the first value equal to the second value in response to the second value being less than the first value.

15. The system of claim 13 where programming comprising instructions stored in the memory to, in response to the second value being greater than the first Page value, increase the first value comprises programming comprising instructions stored in the memory to calculate the filter coefficient as a function of a determined threshold, a determined time constant, and a frame sample rate.

16. The system of claim 13 where programming comprising instructions stored in the memory to select the first frequency magnitude bin comprises programming comprising instructions stored in the memory to monitor the first frequency magnitude bin for the first value to iteratively increase to greater than a threshold value.

17. The system of claim 15 where the filter coefficient has an adjustable time constant, and programming comprising instructions stored in the memory to monitor the first frequency magnitude bin comprises programming comprising instructions stored in the memory to monitor over a determined number of the frames based on the adjustable time constant.

18. The system of claim 15 where instructions stored in the memory to monitor over a determined number of the frames further comprises programming comprising instructions stored in the memory to adjust the adjustable time constant based on a frequency of sound being represented in the first frequency magnitude bin.

19. The system of claim 15 where instructions stored in the memory to monitor over a determined number of the frames further comprises programming comprising instructions stored in the memory to apply a longer time constant to the first frequency magnitude bin in response to the first frequency magnitude bin being representative of a lower sound frequency, and programming comprising instructions stored in the memory to apply a shorter time constant to the first frequency magnitude bin in response to the first frequency magnitude bin being representative of a higher sound frequency.

20. A system for reducing acoustic feedback, comprising:
    converting means for sequentially converting a buffered acoustic signal to a plurality of sequential frames in a frequency domain, each frame comprising an array of frequency magnitude bins;
    comparing means for comparing a first value of a first frequency magnitude bin that is included in a first frame with a second value of the first frequency magnitude bin that is included in a second frame;
    in response to the second value being greater than the first value, the comparing means configured to modify the first value as a function of the first value, the second value and a determined filter coefficient;
    selecting means for selecting the modified first value in the first frequency magnitude bin to be a candidate frequency; and
    setting means for setting a notch filter to the candidate frequency at an attenuation depth and a bandwidth to suppress feedback.

* * * * *